June 22, 1943.  A. KUTSCHA  2,322,578
SIDE MILLING CUTTER
Filed Sept. 28, 1940
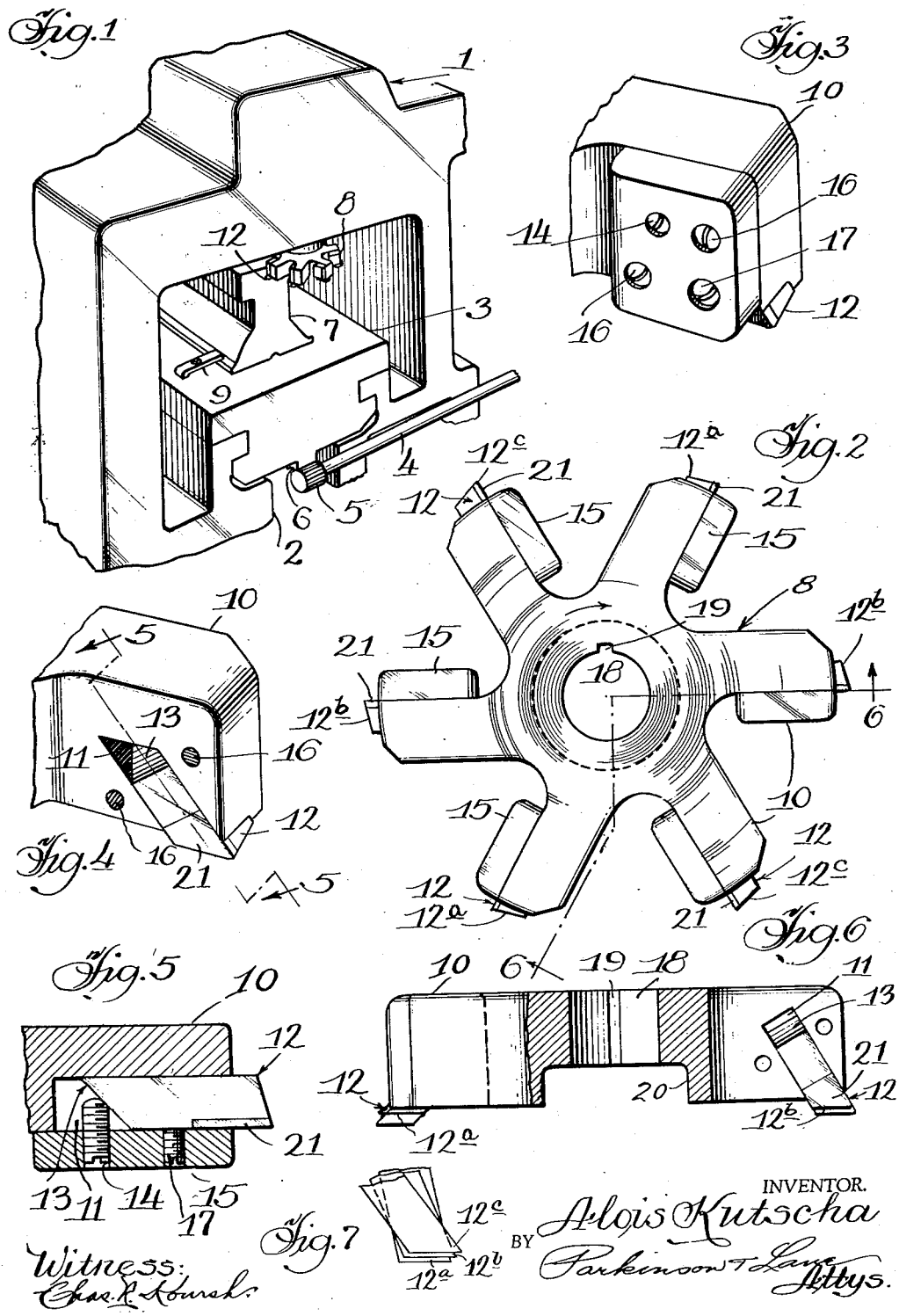
INVENTOR.
Alois Kutscha
BY Parkinson + Lane
Attys.

Patented June 22, 1943

2,322,578

UNITED STATES PATENT OFFICE 2,322,578

SIDE MILLING CUTTER

Alois Kutscha, Chicago, Ill.

Application September 28, 1940, Serial No. 358,844

7 Claims. (Cl. 29—105)

The present invention relates to a side milling cutter and more particularly to a novel cutting tool of the type mounted for rotation on an axis perpendicular to the work to be operated upon. In the present novel construction the cutting tool is provided with a series of projecting arms spaced a suitable distance apart and each arm so constructed and arranged as to adjustably receive and mount a cutting blade with the cutting edges of these blades disposed in progressively spaced planes along the axis of their rotation, and with these blades spaced at varying radii or distances from the axis of rotation.

The invention further comprehends a novel mounting for the cutting blades to permit ready and accurate adjustment of the blades as desired or required for most effectively removing a surface layer of metal from the object operated upon, or for recessing an object.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a view in perspective of the novel side milling cutter or cutting tool and showing its position and relation with respect to a surface to be milled.

Fig. 2 is a top plan view of the novel cutter.

Fig. 3 is a fragmentary enlarged view in perspective of the end of one of the projecting arms and showing the manner of mounting a cutting blade.

Fig. 4 is a view similar to Fig. 3 but with the mounting plate removed.

Fig. 5 is a cross sectional view taken on the line 5—5 of Fig. 4, but with the mounting plate in position.

Fig. 6 is a cross sectional view taken on the irregular line 6—6 of Fig. 2.

Fig. 7 is a diagrammatic view showing the relative positions of successive blades.

Referring more particularly to the disclosure in the drawing, the novel invention is shown in Fig. 1 as embodied in a milling machine 1, having a bed 2 and table 3, the latter being slidable upon the bed by means of any suitable mechanism such as a shaft 4 and pinion 5 in meshing engagement with the teeth on a rack 6 formed or provided on the base or lower edge of the table 3 to thereby feed the work 7 to the cutter head or cutting tool 8 at the proper or desired speed. Any suitable means, such as a removable clamping plate or bracket 9 may be provided for clamping the work in position on the table 3.

The cutting tool 8 is provided with a series of spaced projecting arms 10, each formed with an inclined slot 11 to receive a cutting blade or tool 12. The slots 11 and blades 12 are so disposed that the blades may be readily adjusted by the operator and in order to carry out such adjustment the inner end of each blade is inclined or tapered at 13 to permit outward and/or downward movement of the blade by means of a set screw 14, adjustably or threadedly mounted in a retaining plate 15. This set screw also rigidly retains the blade in anchored position by providing an abutment or barrier against retraction of the blade. Each retaining plate 15 is secured upon a side wall to its arm 10 by means of bolts or other securing means 16, and each blade when once adjusted by means of a set screw 14 and plate 15, is additionally locked in such predetermined position by means of a second set screw 17.

In order to secure the cutter head or tool holder 8 upon a rotating vertical shaft the holder is provided with a central opening 18 and keyway 19, while an enlarged counter-sunk opening 20 is provided for receiving a lock nut or the like to rigidly anchor the tool holder in operative position. Each blade may be of suitable tool steel, although I have had excellent results using a blade having a body of relatively cheap metal but provided with a cutting surface or edge 21 of tool steel suitably affixed to or mounted upon the body 12 of the blade.

Figs. 2 and 6 show each set of three blades so positioned that their lowermost edge or cutting surfaces $12^a$, $12^b$, and $12^c$ are disposed in progressively increasing distances outwardly or radially and in parallel planes perpendicular to the axis of rotation of the cutting tool, but any desired arrangement of the cutting blades may be provided, depending upon the material operated upon and the depth of cut to be taken.

Fig. 7 shows clearly the preferred manner of disposing successive blades in which the cutting edges $12^c$, $12^b$ and $12^a$ decrease in radial length or effective cutting radius but increase in the depth of cut to be taken. This arrangement may be readily accomplished by having the slots 11 of succeeding arms so inclined as to receive these blades in the position or angle shown in Fig. 7. Thus each blade or cutting tool is mounted in its respective inclined slot in such manner as to permit extremely accurate adjustment of cut by each blade or cutting tool. The angle of inclination may be varied to any degree, so that succeeding or alternate blades may be disposed at different angles for securing optimum cutting efficiency under any and all conditions of operation. Furthermore, due to such adjustment, each blade is adjustable outwardly or radially, as well as downwardly or axially of the cutter head.

Although the cutter is shown as mounted on a vertical shaft, it will be readily understood that the cutter head may be operatively mounted upon a horizontal shaft, if desired. It will be further apparent that the tool is adapted for installation and operation upon any standard construction of milling machine, and may be used in dual or multiple relationship, in a manner well known in the art. Furthermore, it will be appreciated that the radii of the successive blades and the depth of cut to be taken by the successive blades are such that optimum efficiency is obtained. The speed of rotation of the cutter head and the speed of travel of the bed 3 are preferably so synchronized that blade 12c cuts the scale or upper surface of the metal, while successive blades 12b and 12a although of lesser radii than 12c, cut successively deeper surfaces of the article.

Having thus disclosed the invention, I claim:

1. A side milling cutter for a milling machine comprising a cutter head having a series of laterally projecting spaced arms, a downwardly and outwardly inclined slot in each of said arms with successive slots varying in inclination, a cutting blade slidably mounted in each slot, means for adjusting said blades both radially and axially of the head to give optimum cutting efficiency, and means for locking each blade in adjusted position.

2. A cutting tool for a milling machine comprising a cutter head of substantially star formation having uniformly spaced projections, an inclined slot provided adjacent the outer end of each projection for both radial and axial adjustment of the cutting blade with respect to the head, a blade adjustably mounted in each slot and provided with a tapered inner end, means disposed at substantially a right angle with respect to each blade for engaging the tapered end thereof to adjust the blade for the desired cutting relation with respect to the work being operated upon, and means for securing each blade in adjusted position.

3. A cutting tool for a milling machine comprising a cutter head of substantially star formation, a plurality of spaced blade supports on said head, a slot provided within each blade support and open at one side thereof, a cutting blade mounted in each slot for radial and axial adjustment with respect to the head, a plate for enclosing the open side of said slot, means in said plate for adjusting the blade, and means for locking each in its adjusted position.

4. A cutting tool for a milling machine comprising a cutter head, a plurality of spaced blade supports on said head, an inclined slot in each support, a cutting blade adapted to be removably and adjustably mounted in each slot for radial and axial adjustment with respect to the head and provided with a tapered inner end, and a set screw adapted to abut against the tapered end for simultaneously adjusting the position of each blade both radially and axially of the head and to dispose its cutting edge in progressively and selectively spaced planes along the axis of rotation of the cutter head and to thereby adjust the depth of cut of each blade.

5. A cutting tool for a milling machine comprising a cutter head having a plurality of outwardly projecting spaced arms, a slot within the body of each arm and inclined both radially and axially of the head, a cutting blade adjustably mounted in each slot, the slots of successive arms disposed at varying inclinations, means for selectively adjusting the operative position of each blade to arrange them in offset relation whereby successive blades cut the material operated upon to a different depth, and means for securing each blade in its adjusted position.

6. A cutting tool for a milling machine comprising a cutter head of substantially star formation having uniformly spaced projections, a slot provided adjacent the outer end of each projection for axial adjustment of the cutting blade with respect to the head, a blade adjustably mounted in each slot and provided with a tapered inner end, means disposed at substantially a right angle with respect to each blade for engaging the tapered end of each blade to adjust the blade for the desired cutting relation with respect to the work being operated upon, and means for securing each blade in adjusted position.

7. A cutting tool for a milling machine comprising a cutter head of substantially star formation having plural spaced projections, a slot provided adjacent the outer end of each projection for axial adjustment of the cutting blade with respect to the head and with the slots progressively arranged at varying radii from the axis of rotation, a blade adjustably mounted in each slot and provided with a tapered inner end, means for engaging said tapered end of each blade to adjust the blade for the desired cutting relation with respect to the work being operated upon, and means for securing each blade in adjusted position.

ALOIS KUTSCHA.